United States Patent [19]

Gancy

[11] 4,400,285

[45] Aug. 23, 1983

[54] WATER-ACTIVATED EXOTHERMIC CHEMICAL DEICING FORMULATIONS

[76] Inventor: Alan B. Gancy, 265 Robineau Rd., Syracuse, N.Y. 13207

[21] Appl. No.: 367,728

[22] Filed: Apr. 12, 1982

[51] Int. Cl.$^3$ ............................................... C09K 3/18
[52] U.S. Cl. ..................................... 252/70; 423/635; 562/607
[58] Field of Search ......................... 252/70; 423/635; 562/607

[56] References Cited

FOREIGN PATENT DOCUMENTS 2933318  3/1981  Fed. Rep. of Germany ........ 252/70

Primary Examiner—John E. Kittle
Assistant Examiner—Robert A. Wax

[57] ABSTRACT

Chemical formulations containing calcium oxide, or unslaked calcined limestone, and a chemical deicing agent. The formulations liberate heat upon contacting ice or snow and materially assist the normal deicing function. Deicer options include calcium acetate, sodium acetate, magnesium acetate, and potassium acetate and sodium chloride (salt). The magnesium acetate containing formulation represents a special case in which the ultimate products formed are magnesium hydroxide and calcium acetate, both relatively harmless to the environment.

8 Claims, No Drawings

WATER-ACTIVATED EXOTHERMIC CHEMICAL DEICING FORMULATIONS

The subject matter of the present invention is related to the subject matter of my two copending applications, Ser. Nos. 367,726 and 367,727.

BACKGROUND OF THE INVENTION

The present invention relates to dry chemical formulations which undergo an exothermic, or heat-liberating action when contacted with water, ice or snow. Chemical deicing agents, also included in the formulations, are assisted in their normal functioning by the said liberted heat. One component of a formulation is always calcium oxide, or calcined limestone. The other component is a chemical deicer in its own right. Of special significance is the formulation in which the deicing agent is magnesium acetate. The novel formulations accelerate the normal deicing of roads, highways, walkways and parking lots.

DESCRIPTION OF THE PRIOR ART

U.S. Pat. No. 2,918,052 to Budenholzer et al, teaches the use of metallic sodium and caustic soda (NaOH) formed in the reaction of sodium and water, as a deicing agent. The exothermic nature of the sodium/water reaction, coupled with the freezing point depressant effect of the caustic soda results in a dual-action deicing agent. Such a scheme is totally impractical for the largest segment of both the commodity chemical and the specialty chemical market. Firstly, metallic sodium would be much too hazardous to distribute to either market. Secondly, the caustic soda produced in situ is a highly soluble, strongly caustic substance which would be environmentally unacceptable in both the municipal and consumer market applications.

Sodium chloride is by far the most widely used chemical deicer in the United States today. Naturally occurring rock salt is mined, ground and shipped to both municipal and consumer markets. It is the cheapest of all known deicers. However, it is environmentally unacceptable, to say the least. A key report issued by the Environmental Protection Agency (EPA) estimates that the societal costs of using salt for deicing are 14 times the cost of salt application itself. Salt is corrosive to portland cement concrete, and especially to reinforced concrete bridge structures. The annual cost of automobile metallic corrosion caused by salt deicer is enormous. Salt is responsible for dispersing soil, thereby aggravating soil erosion by wind and water. The sodium level in groundwaters has increased alarmingly due to salt use, and leads to serious contamination of drinking water.

Even in areas where salt is the only available or (apparently) economical deicing agent, it has a drawback peculiar to the physical chemistry of salt/water systems. When salt dissolves in water, there is a slight absorption of heat. This phenomenon obviously works in opposition to the desired ice-melting function.

Calcium chloride is the next most widely used chemical deicer, although it represents less than 10 percent of the total deicer tonnage used in the U.S. On the basis of freezing point depression theory alone, calcium chloride is even more environmentally unsafe than salt. This is because more of the chloride component of calcium chloride is required to accomplish a given deicing function than that deriving from sodium chloride, or salt. And chloride (ion) is an extremely "aggressive" substance in the terminology of corrosion chemists and engineers. When calcium chloride is applied as a concentrated aqueous solution to roads and highways, this comparison holds.

However, most calcium chloride is applied in solid form to roadway surfaces. Here, the reaction with ice and snow (water) is exothermic, or heat-liberating in contrast to the action of salt. And if essentially all of the water is removed from calcium chloride through calcination, the resulting anhydrous agent undergoes a considerable exothermic transformation when used in deicing. This exothermicity obviously works in the right direction in any ice-melting function. The net result of this phenomenon is that less of the agent is required to do a given deicing job. This, in turn, means less environmental pollution. The reduction in dosage can be dramatic. One calcium chloride vendor makes the (unsubstantiated) claim that 25 pounds of anhydrous calcium chloride is equivalent to 200 pounds of salt in its deicing ability.

It is clear that a deicer possessing an exothermic feature is favored over one which does not, for two reasons: (1) rapid deicing is afforded at a normally required dosage, i.e., that which is theoretically equivalent to the dosage of a non-exothermic deicer; and (2) a much reduced dosage is required in situations where rapid deicing is not needed. In the latter event, environmental pollution can be substantially reduced.

However favorable the exothermic character of calcium chloride may be, the deicer is still a serious threat to the environment because of chloride ion. The ideal deicer would possess an exothermic feature and at the same time be safe to the environment. The exothermic feature of this ideal deicer affords reduced costs under normal treatment conditions, and rapid deicing under emergency conditions where cost is less of a factor.

OBJECTS OF THE INVENTION

Thus it is an important object of the present invention to provide an environmentally safe road and highway deicer which liberates heat upon contact with water, snow or ice.

It is another object of this invention to provide a deicing formulation which in essence converts salt from an endothermic to an exothermic agent.

It is a still further object of this invention to reduce environmental pollution caused by conventional deicers by incorporating in them an exothermic functioning.

It is another object of the invention to provide a formulation for rapid deicing in emergency road, highway, walkway, or parking lot situations.

Finally, it is another object of the invention to provide a relatively cost-effective road and highway deicer.

SUMMARY OF THE INVENTION

Deicing formulations consisting of calcium oxide, or calcined limestone, and a water-soluble chemical possessing freezing-point depressing properties. Specifically, a dry blend of calcium oxide with calcium acetate, a relatively non-polluting deicer. Alternative agents which can be dry-blended with calcium oxide or unslaked calcined limestone are:
  calcium/magnesium acetate
  sodium acetate
  potassium acetate
  sodium chloride (salt), and magnesium acetate The formulation liberates heat upon contact with water, ice or snow due to the highly exothermic conversion of calcium oxide to calcium hydroxide. The relative amount of calcium oxide in any given formulation can vary over a wide range depending upon the desired deicing action, costs, and desired limits on environmental pollution.

The calcium hydroxide formed is highly insoluble, and ultimately reacts with atmospheric carbon dioxide to form harmless calcium carbonate, the chemical equivalent of natural limestone. The magnesium acetate formulation represents a special case in which a metathetical reaction occurs subsequent to application whereby calcium hydroxide is converted to the even more highly insoluble magnesium hydroxide. The latter is chemically identical to the commonly recognized and used "milk of magnesia." Liberated in the metathesis reaction is the highly soluble calcium acetate, a highly effective deicer.

DESCRIPTION OF THE PREFERRED EMBODIMENTS

The slaking of calcined limestone is well known art, and has been practiced commercially in the United States for at least 100 years. The idealized reaction is represented as follows:

$$CaO + H_2O \rightarrow Ca(OH)_2.$$

It is accompanied by the liberation of heat to such an extent that if the reaction is not controlled, steam is energetically generated from the reactor. Such liberated heat could be used to advantage in any deicing function.

Calcium oxide, or calcined limestone, cannot be used alone as a deicer because neither it nor its hydration product is very soluble in water. One prerequisite of a chemical deicer is that it be fairly soluble in water in order to have any effect in depressing the normal freezing point of water. Salt, for example, is soluble to the extent of approximately 25 weight percent in water, and solubility varies slightly with the temperature. Calcium chloride is extraordinarily soluble in water, and this is one factor in its high effectiveness as a deicer.

However, it is one object of the present invention to dry-blend calcium oxide with soluble agents which are deicers in their own right. Accordingly, I have dry-blended finely divided calcium oxide with each of the following finely divided soluble materials:
 sodium chloride (salt)
 calcium acetate
 calcium/magnesium acetate
 sodium acetate
 potassium acetate, and
 magnesium acetate.
These mixtures are stable indefinitely when precautions are taken to exclude atmospheric moisture. They are activated by the addition of liquid water, or upon contact with snow or ice. Heat is liberated thereby due to the formation of calcium hydroxide. At the same time, the soluble portion of the formulation dissolves and effectually lowers the normal freezing point of water. Both of these functions act in a complementary way to afford a highly effective ice-melting function.

In the above series "calcium/magnesium acetate" refers to mixtures of calcium acetate and magnesium acetate wherein the mol ratio of magnesium to calcium ranges from greater than zero, to unity.

Thus all the formulations of the present invention exhibit a dual function: That of a freezing-point depression, which is a longer term phenomenon, and an exothermic response which is shorter term. The latter action assures a rapid initiation of the ice-melting function, while the former acts longer term to lower the normal freezing point of water.

The relative amounts of the two agents in any given formulation will depend upon a number of factors including the need for rapid response, costs, and the degree to which residual calcium hydroxide can be tolerated in the immediate environment.

The acetate radical in all of the listed acetate deicers biodegrades to, ultimately, harmless carbonate. The possibly objectionable component of sodium acetate is therefore sodium ion. On the other hand, this is certainly no worse than salt in that regard. The acetate component, unlike that of chloride in salt, is relatively harmless to metals. In fact, calcium acetate is known to be a metal corrosion inhibitor in some instances. Sodium chloride is never an inhibitor but always an aggressor.

The potassium in potassium acetate is less problematical. After all, potassium is a major component of most if not all agricultural fertilizers. Also, distribution of potassium to the environment assists in offsetting the harmful effects of sodium in ground waters.

Calcium and magnesium are known to be relatively harmless to the environment. In fact, they have the known beneficial function of soil stabilization.

Salt, of course, is the well known deicer which poses the greatest threat to the environment. By blending calcium oxide with salt, I achieve one or both of the following benefits: (1) reduction of the normally required salt dose to effect a given deicing, and (2) acceleration of the initial ice-melting function upon application of the deicer. Salt is known to have a good longer term deicing effect, but behaves poorly when initially applied to surfaces undergoing treatment. Part of the reason for this is that salt actually absorbs rather than liberates heat when it dissolves in water. Calcium chloride, by contrast, affords a rapid initial response when used in dry form.

The magnesium acetate case deserves additional discussion. The reactions which occur are represented as follows:

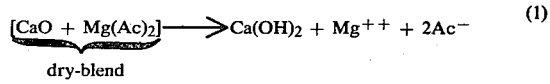
dry-blend (1)

(2)

In (1) the lime-slaking reaction occurs, heat is liberated, and the magnesium acetate dissolves and ionizes. The insoluble calcium hydroxide formed in (1) undergoes a metathetical reaction with magnesium ion to form the relatively very insoluble magnesium hydroxide. The latter can be considered non-polluting. The calcium ion liberated in (2) combines with the acetate ion formed in (1) to produce the very soluble calcium acetate which is an excellent freezing point depressant. Thus, in spite of the transitory existence of calcium hydroxide, the ultimate products formed are calcium acetate and magnesium hydroxide, both relatively safe to the environment.

Note that the above-represented deicer contains calcium oxide (or calcined limestone) and magnesium acetate in equimolar proportions. The relative amount of magnesium acetate in the formulation of this invention is not necessarily so limited, but may range above as well as below the equimolar ratio.

Where magnesium ion is not available in a deicing formulation, the calcium hydroxide formed upon application is largely insoluble. However, it possesses sufficient solubility such that the pH of the water or solution in contact with it falls in the vicinity of 10. This is an alkaline system, and would certainly be objectionable to the environment on a longer term basis. Fortunately, however, this alkalinity does not persist for long due to the ready reaction of calcium hydroxide with atmospheric carbon dioxide to form the harmless calcium carbonate, as represented by the following group of reactions:

$$CO_2 + H_2O \rightleftharpoons H_2CO_3$$

$$H_2CO_3 \rightleftharpoons 2H^+ + CO_3^=$$

$$Ca(OH)_2 \rightleftharpoons Ca^{++} + 2OH^{31}$$

$$Ca^{++} + CO_3^= \rightleftharpoons CaCO_3.$$

The net reaction is $CO_2 + Ca(OH)_2 \rightarrow CaCO_3 + H_2O$.

In the northeastern part of the U.S. particularly, the phenomenon of acid rain is increasingly becoming an environmental hazard. Acid rain is formed through the combination of sulfur oxides and nitrogen oxides emanating from coal-burning power plants, with atmospheric moisture. The larger contributor to acid rain is sulfur oxides. Additionally, sulfuric acid is known to be an objectionable component of automobile exhaust emissions.

To the extent that the deicing formulations of my present invention are used, the effects of acid rain and acid auto emissions are to some degree counteracted in the environment. This is due to the neutralization reaction between calcium hydroxide with acid to produce, for example, insoluble and harmless calcium sulfate, or gypsum. This is represented as follows:

$$H_2SO_4 + Ca(OH)_2 \rightarrow CaSO_4 + 2H_2O$$

$$CaSO_4 + 2H_2O \rightarrow CaSO_4 \cdot 2H_2O.$$

In the case of the acetate-containing formulations of my present invention, and in the event of a deficiency of calcium hydroxide to effect a complete neutralization as above represented, the formulation still functions to help counteract acid rain. It does so by converting sulfuric and other mineral acids to acetic acid, as follows:

$$H^+(\text{acid rain}) + Ac^- \rightleftharpoons HAc.$$

The acetic, in turn, is a weak acid. In other words, strong acids of contamination are converted to a weak acid which is relatively harmless. Another way to express it is to say that the acetate ion "ties up" most of the hydrogen ion emanating from the mineral acids. Additionally, some small portion of the acetic acid will be volatilized into the atmosphere and by this mechanism is removed from the soil. Ultimately the acetic acid will biodegrade to harmless carbon dioxide and water.

Thus the acetate formulations of my present invention can function in two ways to counteract the effects of acid rain and of auto emissions in the environment.

I claim:

1. A dry, water-activated exothermic chemical formulation containing calcium oxide, or calcined limestone, and a water-soluble acetate salt.

2. The formulation of claim 1 wherein said acetate salt is calcium acetate.

3. The formulation of claim 1 wherein said acetate salt is calcium/magnesium acetate.

4. The formulation of claim 1 wherein said acetate salt is magnesium acetate.

5. The formulation of claim 1 wherein said acetate salt is sodium acetate.

6. The formulation of claim 1 wherein said acetate salt is potassium acetate.

7. The formulations of any one of claims 1–6 wherein the weight percent of active calcium oxide is greater than zero, but less than or equal to 50.

8. The formulations of any one of claims 1–7 wherein the finely divided components are thoroughly dry blended, and then pelletized or otherwise aggregated for economical application as surface deicers.

* * * * *